(12) United States Patent
Sollami (10) Patent No.: US 10,612,375 B2
(45) Date of Patent: Apr. 7, 2020

(54) BIT RETAINER

(71) Applicant: Phillip Sollami, Herrin, IL (US)

(72) Inventor: Phillip Sollami, Herrin, IL (US)

(73) Assignee: The Sollami Company, Herrin, IL (US)

( * ) Notice: Subject to any disclaimer, the term of this patent is extended or adjusted under 35 U.S.C. 154(b) by 69 days.

(21) Appl. No.: 15/088,246

(22) Filed: Apr. 1, 2016

(65) Prior Publication Data

US 2019/0330983 A1   Oct. 31, 2019

(51) Int. Cl.
| | | |
|---|---|---|
| *E21C 35/197* | (2006.01) | |
| *F16B 21/18* | (2006.01) | |
| *E21C 35/18* | (2006.01) | |

(52) U.S. Cl.
CPC .......... *E21C 35/197* (2013.01); *E21C 35/18* (2013.01); *F16B 21/183* (2013.01)

(58) Field of Classification Search
CPC ....... E21C 35/197; E21C 35/19; B28D 1/186; B28D 1/188; E02F 9/2841; F16B 21/18; F16B 21/183
USPC .......................................... 411/518, 519, 517
See application file for complete search history.

(56) References Cited

U.S. PATENT DOCUMENTS

| | | | |
|---|---|---|---|
| 2,382,947 A * | 8/1945 | Brozek .................. | F16B 21/18 411/518 |
| 3,342,532 A | 9/1967 | Krekeler | |
| 3,397,012 A | 8/1968 | Krekeler | |
| 3,476,438 A | 11/1969 | Bower, Jr. | |
| 3,519,309 A | 7/1970 | Engle | |
| 3,833,264 A | 9/1974 | Elders | |
| 3,833,265 A | 9/1974 | Elders | |
| 3,865,437 A | 2/1975 | Crosby | |
| 4,084,856 A | 4/1978 | Emmerich | |
| 4,247,150 A * | 1/1981 | Wrulich ................ | E21C 35/197 175/227 |
| RE30,807 E | 12/1981 | Elders | |
| 4,310,939 A | 1/1982 | Iijima | |
| 4,489,986 A | 12/1984 | Dziak | |
| 4,525,178 A | 6/1985 | Hall | |
| 4,561,698 A | 12/1985 | Beebe | |

(Continued)

FOREIGN PATENT DOCUMENTS

| | | |
|---|---|---|
| DE | 102004049710 | 4/2006 |
| DE | 102011079115 | 1/2013 |

(Continued)

*Primary Examiner* — Janine M Kreck
*Assistant Examiner* — Michael A Goodwin
(74) *Attorney, Agent, or Firm* — Mercedes V. O'Connor; Rockman Videbeck & O'Connor (57) ABSTRACT

An improved bit retainer having a retainer body that includes an arcuate top portion defining a radially expandable area. The bit retainer including a pair of opposed arcuate legs depending from the arcuate top portion, the pair of opposed arcuate legs having a radial cross-section greater than the radial cross-section of the radially expandable area. Each leg includes a cavity adjacent a distal end of the leg. The bit retainer adapted to engage an annular groove of a shank of a pick or unitary bit/holder when the bit is inserted into a bore of a base block and retain the bit within the bore of the base block. A first embodiment of the bit retainer having a flat side profile and a second embodiment of the bit retainer having a curved side profile.

14 Claims, 11 Drawing Sheets

(56) References Cited

U.S. PATENT DOCUMENTS

| | | |
|---|---|---|
| 4,570,726 A | 2/1986 | Hall |
| 4,604,106 A | 8/1986 | Hall |
| 4,632,463 A | 12/1986 | Sterwerf, Jr. |
| 4,694,918 A | 9/1987 | Hall |
| 4,702,525 A | 10/1987 | Sollami |
| 4,763,956 A * | 8/1988 | Emmerich ............ E21C 35/197 299/107 |
| 4,811,801 A | 3/1989 | Salesky |
| 4,818,027 A | 4/1989 | Simon |
| 4,821,819 A | 4/1989 | Whysong |
| 4,844,550 A | 7/1989 | Beebe |
| 4,915,455 A | 4/1990 | O'Niell |
| 4,944,559 A | 7/1990 | Sionett |
| 5,067,775 A | 11/1991 | D'Angelo |
| 5,088,797 A | 2/1992 | O'Neill |
| 5,098,167 A | 3/1992 | Latham |
| 5,161,627 A | 11/1992 | Burkett |
| 5,273,343 A | 12/1993 | Ojanen |
| 5,287,937 A | 2/1994 | Sollami |
| 5,302,005 A | 4/1994 | O'Neill |
| 5,303,984 A | 4/1994 | Ojanen |
| 5,352,079 A * | 10/1994 | Croskey ................ F16B 21/183 411/35 |
| 5,374,111 A | 12/1994 | Den Besten |
| 5,415,462 A | 5/1995 | Massa |
| 5,417,475 A | 5/1995 | Graham et al. |
| 5,458,210 A | 10/1995 | Sollami |
| 5,484,191 A | 1/1996 | Sollami |
| 5,551,760 A | 9/1996 | Sollami |
| 5,628,549 A | 5/1997 | Ritchey |
| 5,720,528 A * | 2/1998 | Ritchey ................ E21C 35/197 299/107 |
| 5,725,283 A | 3/1998 | O'Neill |
| 5,823,632 A | 10/1998 | Burkett |
| 5,924,501 A | 7/1999 | Tibbitts |
| 5,931,542 A | 8/1999 | Britzke |
| 5,934,854 A * | 8/1999 | Krautkremer ......... B23P 19/084 403/326 |
| 5,992,405 A | 11/1999 | Sollami |
| D420,013 S | 2/2000 | Warren |
| 6,019,434 A | 2/2000 | Emmerich |
| 6,102,486 A | 8/2000 | Briese |
| 6,176,552 B1 | 1/2001 | Topka, Jr. |
| 6,341,823 B1 | 1/2002 | Sollami |
| 6,357,832 B1 | 3/2002 | Sollami |
| 6,371,567 B1 | 4/2002 | Sollami |
| 6,382,733 B1 | 5/2002 | Parrott |
| 6,428,110 B1 * | 8/2002 | Ritchey ................ E02F 9/2866 24/673 |
| 6,508,516 B1 | 1/2003 | Kammerer |
| D471,211 S | 3/2003 | Sollami |
| 6,584,810 B2 | 7/2003 | Montgomery |
| 6,585,326 B2 | 7/2003 | Sollami |
| 6,685,273 B1 | 2/2004 | Sollami |
| 6,692,083 B2 | 2/2004 | Latham |
| D488,170 S | 4/2004 | Sollami |
| 6,733,087 B2 | 5/2004 | Hall |
| 6,739,327 B2 | 5/2004 | Sollami |
| 6,824,225 B2 | 11/2004 | Stiffler |
| 6,968,912 B2 | 11/2005 | Sollami |
| 6,994,404 B1 | 2/2006 | Sollami |
| 7,097,258 B2 | 8/2006 | Sollami |
| 7,118,181 B2 | 10/2006 | Frear |
| 7,150,505 B2 | 12/2006 | Sollami |
| 7,195,321 B1 | 3/2007 | Sollami |
| 7,210,744 B2 | 5/2007 | Montgomery |
| 7,229,136 B2 | 6/2007 | Sollami |
| 7,234,782 B2 | 6/2007 | Stehney |
| D554,162 S | 10/2007 | Hall |
| 7,320,505 B1 | 1/2008 | Hall |
| 7,338,135 B1 | 3/2008 | Hall |
| 7,347,292 B1 | 3/2008 | Hall |
| D566,137 S | 4/2008 | Hall |
| 7,353,893 B1 | 4/2008 | Hall |
| 7,384,105 B2 | 6/2008 | Hall |
| 7,396,086 B1 | 6/2008 | Hall |
| 7,401,863 B1 | 7/2008 | Hall |
| 7,410,221 B2 | 8/2008 | Hall |
| 7,413,256 B2 | 8/2008 | Hall |
| 7,413,258 B2 | 8/2008 | Hall |
| 7,419,224 B2 | 9/2008 | Hall |
| 7,445,294 B2 | 11/2008 | Hall |
| D581,952 S | 12/2008 | Hall |
| 7,464,993 B2 | 12/2008 | Hall |
| 7,469,756 B2 | 12/2008 | Hall |
| 7,469,972 B2 | 12/2008 | Hall |
| 7,475,948 B2 | 1/2009 | Hall |
| 7,523,794 B2 | 4/2009 | Hall |
| 7,568,770 B2 | 8/2009 | Hall |
| 7,569,249 B2 | 8/2009 | Hall |
| 7,569,971 B2 | 8/2009 | Andle et al. |
| 7,571,782 B2 | 8/2009 | Hall |
| 7,575,425 B2 | 8/2009 | Hall |
| 7,588,102 B2 | 9/2009 | Hall |
| 7,594,703 B2 | 9/2009 | Hall |
| 7,600,544 B1 | 10/2009 | Sollami |
| 7,600,823 B2 | 10/2009 | Hall |
| 7,628,233 B1 | 12/2009 | Hall |
| 7,637,574 B2 | 12/2009 | Hall |
| 7,648,210 B2 | 1/2010 | Hall |
| 7,665,552 B2 | 2/2010 | Hall |
| 7,669,938 B2 | 3/2010 | Hall |
| 7,681,338 B2 | 3/2010 | Hall |
| 7,712,693 B2 | 5/2010 | Hall |
| 7,717,365 B2 | 5/2010 | Hall |
| 7,789,468 B2 | 9/2010 | Sollami |
| 7,832,808 B2 | 11/2010 | Hall |
| 7,883,155 B2 | 2/2011 | Sollami |
| 7,950,745 B2 | 5/2011 | Sollami |
| 7,963,617 B2 | 6/2011 | Hall |
| 7,992,944 B2 | 8/2011 | Hall |
| 7,992,945 B2 | 8/2011 | Hall |
| 7,997,660 B2 | 8/2011 | Monyak et al. |
| 8,007,049 B2 | 8/2011 | Fader |
| 8,007,051 B2 | 8/2011 | Hall |
| 8,033,615 B2 | 10/2011 | Hall |
| 8,038,223 B2 | 10/2011 | Hall |
| 8,061,784 B2 | 11/2011 | Hall |
| 8,109,349 B2 | 2/2012 | Hall |
| 8,118,371 B2 | 2/2012 | Hall |
| 8,136,887 B2 | 3/2012 | Hall |
| 8,201,892 B2 | 6/2012 | Hall |
| 8,215,420 B2 | 7/2012 | Hall |
| 8,292,372 B2 | 10/2012 | Hall |
| 8,540,320 B2 | 9/2013 | Sollami |
| RE44,690 E | 1/2014 | Sollami |
| 8,622,482 B2 | 1/2014 | Sollami |
| 8,622,483 B2 | 1/2014 | Sollami |
| 8,646,848 B2 | 2/2014 | Hall |
| 9,039,099 B2 | 5/2015 | Sollami |
| 9,879,531 B2 | 1/2018 | Sollami |
| 9,909,416 B1 | 3/2018 | Sollami |
| 2002/0074850 A1 | 6/2002 | Montgomery, Jr. |
| 2002/0074851 A1 | 6/2002 | Montgomery, Jr. |
| 2002/0109395 A1 | 8/2002 | Sollami |
| 2002/0167216 A1 | 11/2002 | Sollami |
| 2002/0192025 A1 * | 12/2002 | Johnson ................ E01C 5/20 404/41 |
| 2003/0015907 A1 | 1/2003 | Sollami |
| 2003/0052530 A1 | 3/2003 | Sollami |
| 2003/0122414 A1 | 7/2003 | Sollami |
| 2003/0209366 A1 | 11/2003 | McAlvain |
| 2004/0004389 A1 | 1/2004 | Latham |
| 2005/0212345 A1 | 9/2005 | Sleep et al. |
| 2005/0214101 A1 * | 9/2005 | Dexter ................ F16B 21/18 411/518 |
| 2006/0071538 A1 | 4/2006 | Sollami |
| 2006/0186724 A1 | 8/2006 | Stehney |
| 2006/0261663 A1 | 11/2006 | Sollami |
| 2007/0013224 A1 | 1/2007 | Stehney |
| 2007/0040442 A1 | 2/2007 | Weaver |
| 2007/0052279 A1 | 3/2007 | Sollami |
| 2008/0036276 A1 | 2/2008 | Hall et al. |

(56) References Cited

U.S. PATENT DOCUMENTS

| | | |
|---|---|---|
| 2008/0036283 A1 | 2/2008 | Hall et al. |
| 2008/0100124 A1 | 5/2008 | Hall et al. |
| 2008/0145686 A1 | 6/2008 | Mirchandani |
| 2008/0164747 A1 | 7/2008 | Weaver et al. |
| 2008/0284234 A1 | 11/2008 | Hall et al. |
| 2009/0146491 A1 | 6/2009 | Fader et al. |
| 2009/0160238 A1 | 6/2009 | Hall et al. |
| 2009/0200857 A1 | 8/2009 | Hall |
| 2009/0256413 A1 | 10/2009 | Majagi |
| 2009/0261646 A1 | 10/2009 | Ritchie et al. |
| 2010/0045094 A1 | 2/2010 | Sollami |
| 2010/0253130 A1 | 10/2010 | Sollami |
| 2010/0320003 A1 | 12/2010 | Sollami |
| 2010/0320829 A1 | 12/2010 | Sollami |
| 2011/0006588 A1 | 1/2011 | Monyak et al. |
| 2011/0089747 A1 | 4/2011 | Helsel |
| 2011/0175430 A1 | 7/2011 | Heiderich et al. |
| 2011/0204703 A1 | 8/2011 | Sollami |
| 2011/0254350 A1 | 10/2011 | Hall |
| 2012/0001475 A1 | 1/2012 | Dubay et al. |
| 2012/0027514 A1 | 2/2012 | Hall |
| 2012/0038203 A1 | 2/2012 | Hall |
| 2012/0056465 A1 | 3/2012 | Gerer et al. |
| 2012/0104830 A1 | 5/2012 | Monyak et al. |
| 2012/0242136 A1 | 9/2012 | Ojanen |
| 2012/0248663 A1 | 10/2012 | Hall |
| 2012/0261977 A1 | 10/2012 | Hall |
| 2012/0286559 A1 | 11/2012 | Sollami |
| 2013/0169023 A1 | 7/2013 | Monyak |
| 2013/0181501 A1 | 7/2013 | Hall et al. |
| 2013/0199693 A1 | 8/2013 | Tank et al. |
| 2013/0307316 A1 | 11/2013 | Roetsch et al. |
| 2014/0035346 A1 | 2/2014 | Fundakowski et al. |
| 2014/0110991 A1 | 4/2014 | Sollami |
| 2014/0232172 A1 | 8/2014 | Roth et al. |
| 2014/0262541 A1 | 9/2014 | Parsana et al. |
| 2015/0028656 A1 | 1/2015 | Sollami |
| 2015/0035343 A1 | 2/2015 | Ojanen |
| 2015/0198040 A1 | 7/2015 | Voitic et al. |
| 2015/0240634 A1 | 8/2015 | Sollami |
| 2015/0285074 A1 | 10/2015 | Sollami |
| 2015/0292325 A1 | 10/2015 | Sollami |
| 2015/0308488 A1 | 10/2015 | Kahl |
| 2015/0315910 A1 | 11/2015 | Sollami |
| 2016/0102550 A1 | 4/2016 | Paros et al. |
| 2016/0194956 A1 | 7/2016 | Sollami |
| 2016/0229084 A1 | 8/2016 | Lehnert |
| 2016/0237818 A1 | 8/2016 | Weber et al. |
| 2017/0089198 A1 | 3/2017 | Sollami |
| 2017/0101867 A1 | 4/2017 | Hall et al. |

FOREIGN PATENT DOCUMENTS

| | | |
|---|---|---|
| DE | 102015121953 | 7/2016 |
| DE | 102016118658 | 3/2017 |
| GB | 1114156 | 5/1968 |
| GB | 2534370 | 7/2016 |
| WO | 2008105915 A2 | 9/2008 |
| WO | 2008105915 A3 | 9/2008 |
| WO | 2009006612 | 1/2009 |

\* cited by examiner

BIT RETAINER

TECHNICAL FIELD

This disclosure relates to an improved bit retainer for bit assemblies used in road milling, mining, and trenching equipment.

BACKGROUND

Road milling, mining, and trenching equipment utilizes bit assemblies having a pick, a unitary bit/holder, and/or a bit holder and a base block. A bit tip insert is retained by the unitary bit/holder and the bit/holder is retained within a bore in the base block. A plurality of the bit assemblies are mounted on the outside of a rotatable drum, typically in a V-shaped or spiral configuration. The combinations of bit assemblies have been utilized to remove material from the terra *firma*, such as degrading the surface of the earth, minerals, cement, concrete, macadam or asphalt pavement. The forces and vibrations exerted on the bit assemblies from the harsh road degrading environment may cause the bit/holder to move within the bore of the base block. Retainers have been used to allow rotational movement and retain the unitary bit/holder within the base block. Heavy duty road milling, mining, and trenching, however, imposes much more wear and tear than the currently used industry standard retainers can handle. To prolong the life of the bit assembly and prevent damage to the bit assemblies in heavy duty operations, a heavy duty retainer is provided to maintain the pick or unitary bit/holder within the base block, preventing unnecessary movement while allowing the freedom to incrementally rotate, and reduce the axial distance between the unitary bit/holder and the base block.

SUMMARY

This disclosure relates generally to bit assemblies for road milling, mining, and in particular trenching equipment. One implementation of the teachings herein is a retainer for a bit assembly that includes a retainer body having an arcuate top portion that defines a radially expandable area having a first radial cross-section. A pair of opposed arcuate legs depend from the arcuate top portion, wherein each leg has a cavity adjacent a distal end of the leg. The pair of opposed arcuate legs have a second radial cross-section that is greater than the first radial cross-section of the radially expandable area.

These and other aspects of the present disclosure are disclosed in the following detailed description of the embodiments, the appended claims and the accompanying figures.

BRIEF DESCRIPTION OF THE DRAWINGS

The various features, advantages, and other uses of the apparatus will become more apparent by referring to the following detailed description and drawings, wherein like reference numerals refer to like parts throughout the several views. It is emphasized that, according to common practice, the various features of the drawings are not to-scale. On the contrary, the dimensions of the various features are arbitrarily expanded or reduced for clarity.

DETAILED DESCRIPTION

Road milling, mining, and trenching equipment utilizes bit assemblies having a pick, a unitary bit/holder, and/or a bit holder, comprising a bit body and a shank, and a base block. A bit tip insert is retained by the bit and the shank of the bit is retained within a bore in the base block. The combinations of bit assemblies have been utilized to remove material from the terra *firma*, such as degrading the surface of the earth, minerals, cement, concrete, macadam or asphalt pavement. Individual bits and base blocks may wear down or break over time due to the harsh road trenching environment. Tungsten carbide and diamond or polycrystalline diamond coatings, which are much harder than steel, have been used to prolong the useful life of bits and bit assemblies. Base blocks are generally made of steel. Forces and vibrations exerted on the bit assemblies may cause the shank and the bit to wear away the bore of the base block. As a result, the diameter of the bore of the base block increases over time, adding additional clearance between the shank of the bit and the bore of the base block and damaging the base block. The damage to the base block may require replacement of the base block long before the standard minimum lifetime required by the industry. Additionally, over time, a forward face of the base block wears away due to the rotation of the bit, increasing the axial distance between a tire portion of the bit and the forward face of the base block and increasing the risk of damage to the shank of the bit. One important aspect of the present disclosure is to provide a bit retainer adapted to prevent retainer failure and reduce bore wear within the base block and to maintain the bit within the base block, thereby prolonging the life of the base block and the bit assembly. Another important aspect of the present disclosure is to provide a bit retainer that is suitable for heavy duty milling, mining, and trenching operations. Yet another important aspect of the present disclosure is to provide a bit retainer that reduces the distance between a tire portion of the bit and a forward face of the base block, thereby reducing the risk of damage to the shank of the bit.

Figure 17:
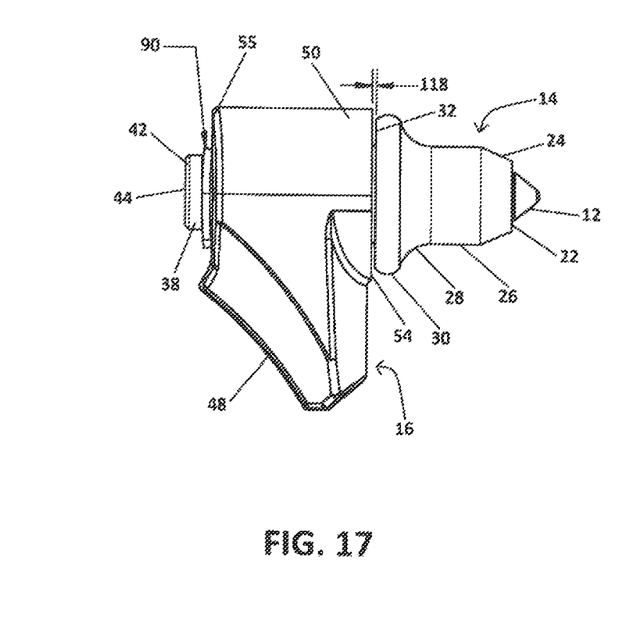
FIG. 17 is a side elevation view of the bit assembly, showing the second embodiment of the bit retainer.
Figure 18:
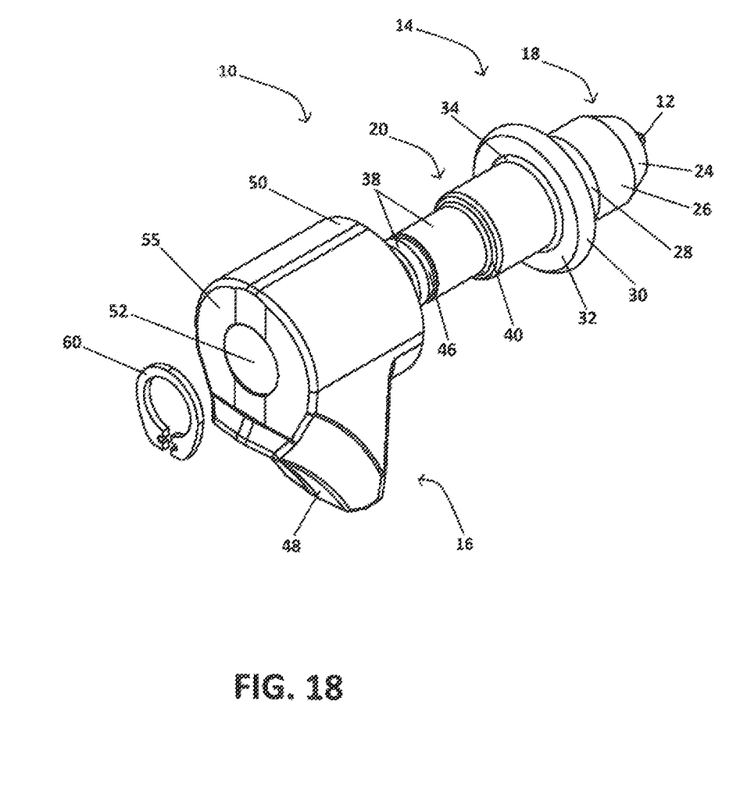
FIG. 18 is an exploded rear side perspective view of the bit assembly, showing the first embodiment of the bit retainer.
Figure 19:
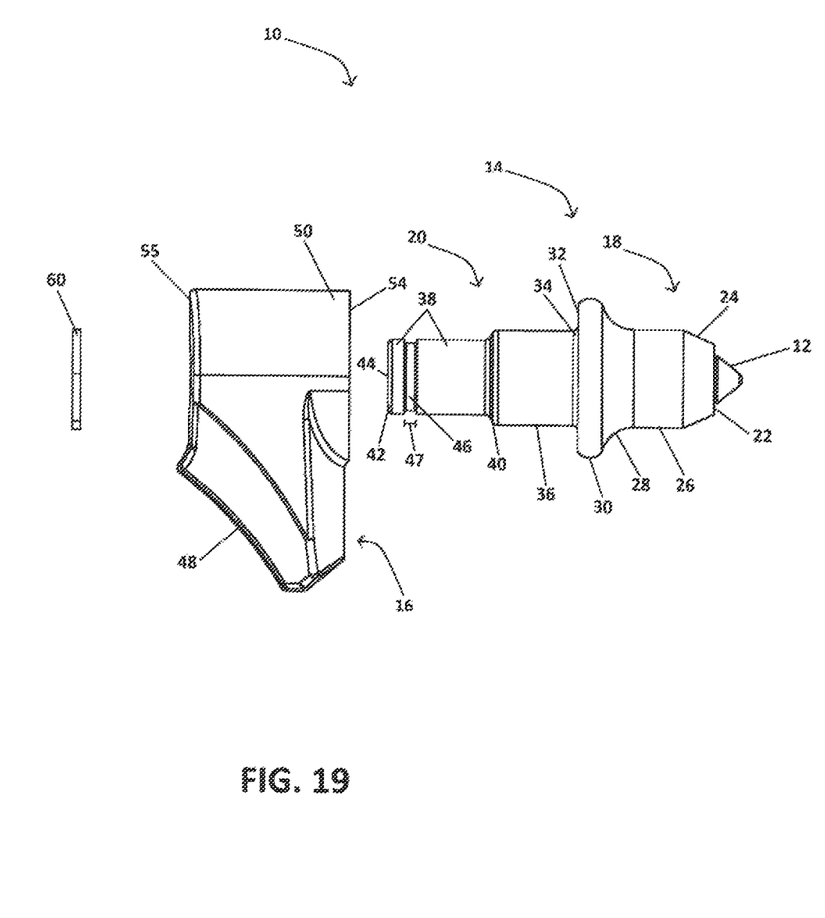
FIG. 19 is an exploded side elevation view of the bit assembly, showing the first embodiment of the bit retainer.

FIGS. 17 and 18 illustrate an embodiment of a bit assembly 10 in which aspects of this disclosure can be implemented. The bit assembly 10 comprises a bit tip insert 12, a bit 14, and a base block 16. The bit 14 includes a bit body 18 and a shank 20 axially depending from the bottom of the bit body 18. The bit body 18 is generally annular in shape and comprises a flat top surface 22 adjacent to an upper body portion 24 that retains the bit tip insert 12. The upper body portion 24 generally slopes axially and radially outwardly to a generally cylindrical first mediate portion 26. The first mediate portion 26 generally slopes axially and radially outwardly to a second mediate portion 28. The second mediate portion 28 generally slopes axially and radially outwardly to a radially extending generally arcuate tire portion 30. A decreased diameter tapered distal portion 34 extends from a rear flange 32, such as a flat annular flange, subjacent to the tire portion 30.

The shank 20, coaxial with the bit body 18, axially depends from the decreased diameter tapered distal portion 34 of the bit body 18, as shown in FIGS. 9, 10, 12, 14, and 16. The shank 20 may be solid and may have a single diameter along its entire length, or may have sections of varying diameters. In other embodiments, the shank 20 can be cylindrical or can include tapered and arcuate segments. The shank 20 in the illustrated embodiment comprises a generally cylindrical increased diameter first segment 36 that axially extends from the decreased diameter tapered distal portion 34 and a generally cylindrical decreased diameter second segment 38. The first segment 36 is joined to the second segment 38 by a shoulder 40. The second segment 38 axially extends from the shoulder 40 to the distal end 44 of the shank 20. Subjacent the second segment 38 is a decreased diameter distal segment 42 that axially extends from the second segment 38 to the distal end 44 of the shank 20. The second segment 38 includes an annular groove 46, having an axial length 47, adjacent the distal end 44 of the shank 20 where it can be engaged by a bit retainer.

The base block 16, shown in FIGS. 17 and 18, comprises a base 48 and a front end 50 having a forward face 54. The base 48 can be flat or slightly concave to fit a drum or additional mounting plates on which a plurality of base blocks can be mounted. The front end 50 includes a base block bore 52, shown in FIG. 17, that is symmetrical with the shank 20 along a centerline.

Figure 1A:
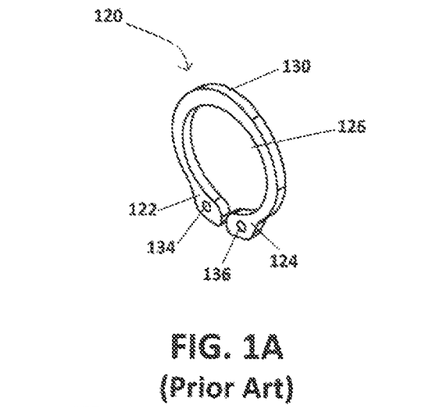
FIG. 1A is a perspective view of a bit retainer of the prior art.
Figure 1B:
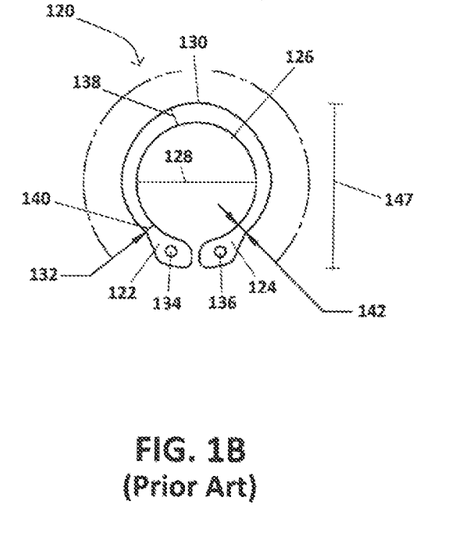
FIG. 1B is a rear elevation view of the bit retainer of the prior art.
Figure 1C:
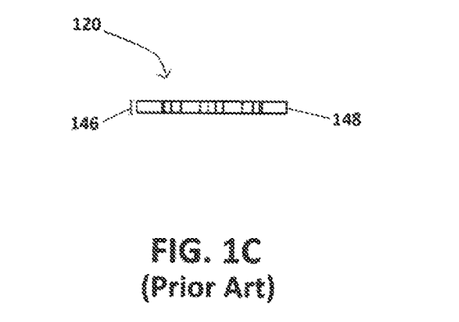
FIG. 1C is a bottom elevation view of the bit retainer of the prior art.
Figure 21:
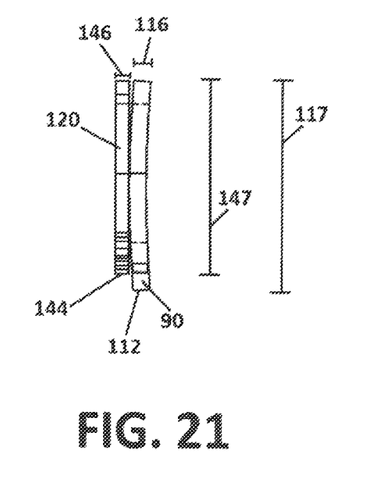
FIG. 21 is a side elevation view of the prior art bit retainer adjacent left of the second embodiment of the bit retainer.
Figure 23:
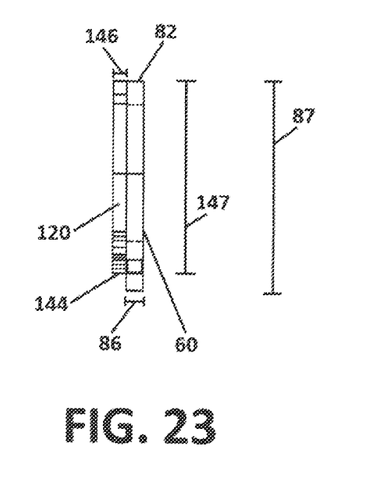
FIG. 23 is a side elevation view of the prior art bit retainer adjacent left of the first embodiment of the bit retainer.

Referring to FIGS. 1A-1C, a typical prior art bit retainer 120 includes a flat, metal body having a flat side profile 144, a thickness 146, and a length 147, as shown in FIGS. 21 and 23. The bit retainer 120 includes a pair of arcuate legs 122, 124 that define an aperture 126 of the bit retainer 120. A diameter 128 of the aperture 126 is at least the diameter of the annular groove 46, such that the bit retainer 120 can fit around the annular groove 46 of the shank 20. Legs 122, 124 are joined together by an arcuate portion 130 that defines a radially expandable area 132 having a varying radial cross-section. Radial cross-section 138 is greater than radial cross-sections 140, 142, as shown in FIG. 1B. Radial cross-sections 140, 142 are the smallest cross-sections of the radially expandable area 132, which lead to failure points at radial cross-sections 140, 142. Legs 122, 124 include a pair of opposed apertures 134, 136.

Figure 2:
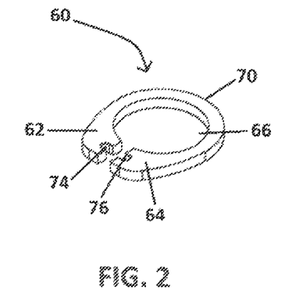
FIG. 2 is a perspective view of a first embodiment of a bit retainer.
Figure 3:
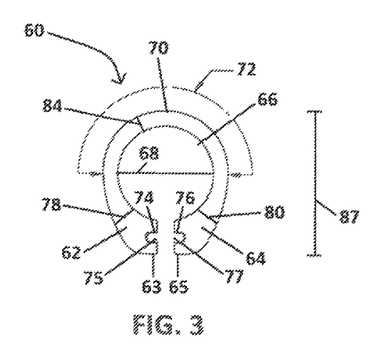
FIG. 3 is a rear elevation view of the first embodiment of the bit retainer.
Figure 4:
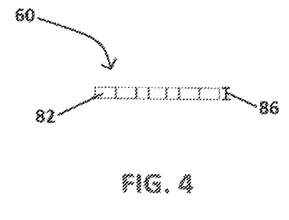
FIG. 4 is a bottom elevation view of the first embodiment of the bit retainer.
Figure 22:
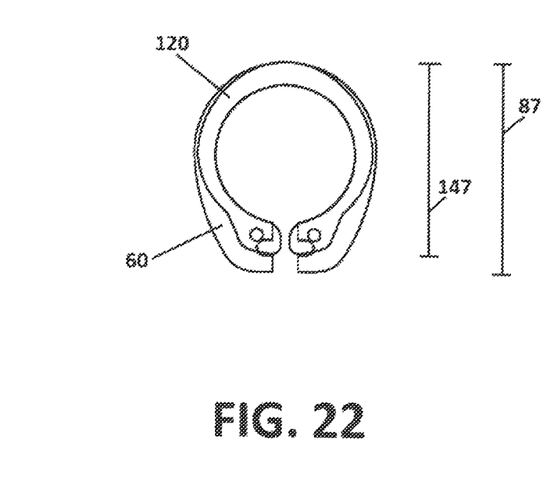
FIG. 22 is a rear elevation view of the prior art bit retainer on top of the first embodiment of the bit retainer.

A first embodiment of a bit retainer 60 is shown in FIGS. 2-4. The bit retainer 60 includes a flat, metal body having a flat side profile 82, shown in FIG. 4. The bit retainer 60 has a thickness 86 and a length 87 that is greater than the thickness 146 and the length 147 of the bit retainer 120 of the prior art, respectively, shown in FIG. 23, making the bit retainer 60 suitable for heavy duty operations. The bit retainer 60 includes a pair of arcuate legs 62, 64 that define an aperture 66 of the bit retainer 60. A diameter 68 of the aperture 66 is at least the diameter of the annular groove 46, such that the bit retainer 60 can fit around the annular groove 46 of the shank 20. Legs 62, 64 are joined together by an arcuate portion 70 that defines a radially expandable area 72, shown in FIG. 3, having a radial cross-section 84. Radial cross-section 84 may be constant, may vary slightly, or may be designed with a variable profile to provide better expansion characteristics for other applications. In the illustrated embodiment, the radially expandable area 72 comprises 180 degrees of the arcuate portion 70. An increased radial cross-section 78 is disposed between a distal end 63 of the leg 62 and the arcuate portion 70 and an increased radial cross-section 80 is disposed between a distal end 65 of the leg 64 and the arcuate portion 70. The radial cross-sections 78, 80 are greater than the radial cross-sections 140, 142 of the bit retainer 120 of the prior art, respectively, as shown in FIG. 22. The increased radial cross-sections 78, 80 are greater than the radial cross-section 84 of the radially expandable area 72, thereby reducing the risk of failures at the increased radial cross-sections 78, 80. Legs 62, 64 include a pair of opposed arcuate cavities 74, 76, respectively, adapted to guide and secure the tips of an expansion tool during removal of the bit retainer. The arcuate cavity 74 includes an open end 75 opposite an open end 77 of the arcuate cavity 76, as shown in FIG. 3. In the illustrated embodiment, the arcuate cavities 74, 76 are U-shaped, however, the arcuate cavities 74, 76 may comprise any shape.

Figures 5, 6, 7:
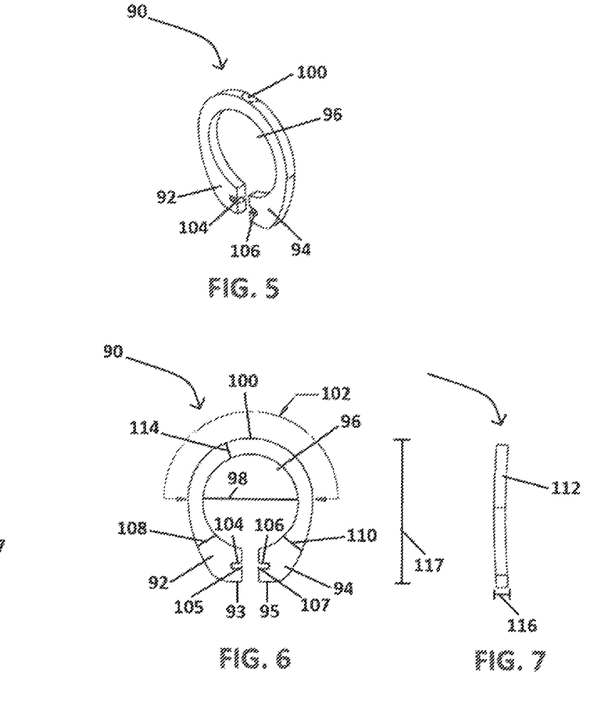
FIG. 5 is a perspective view of a second embodiment of the bit retainer.
FIG. 6 is a rear elevation view of the second embodiment of the bit retainer.
FIG. 7 is a side elevation view of the second embodiment of the bit retainer.
Figure 8:
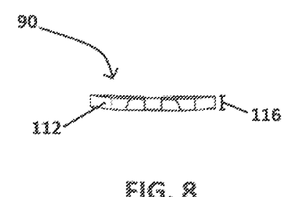
FIG. 8 is a bottom elevation view of the second embodiment of the bit retainer.
Figures 9, 10, 11:
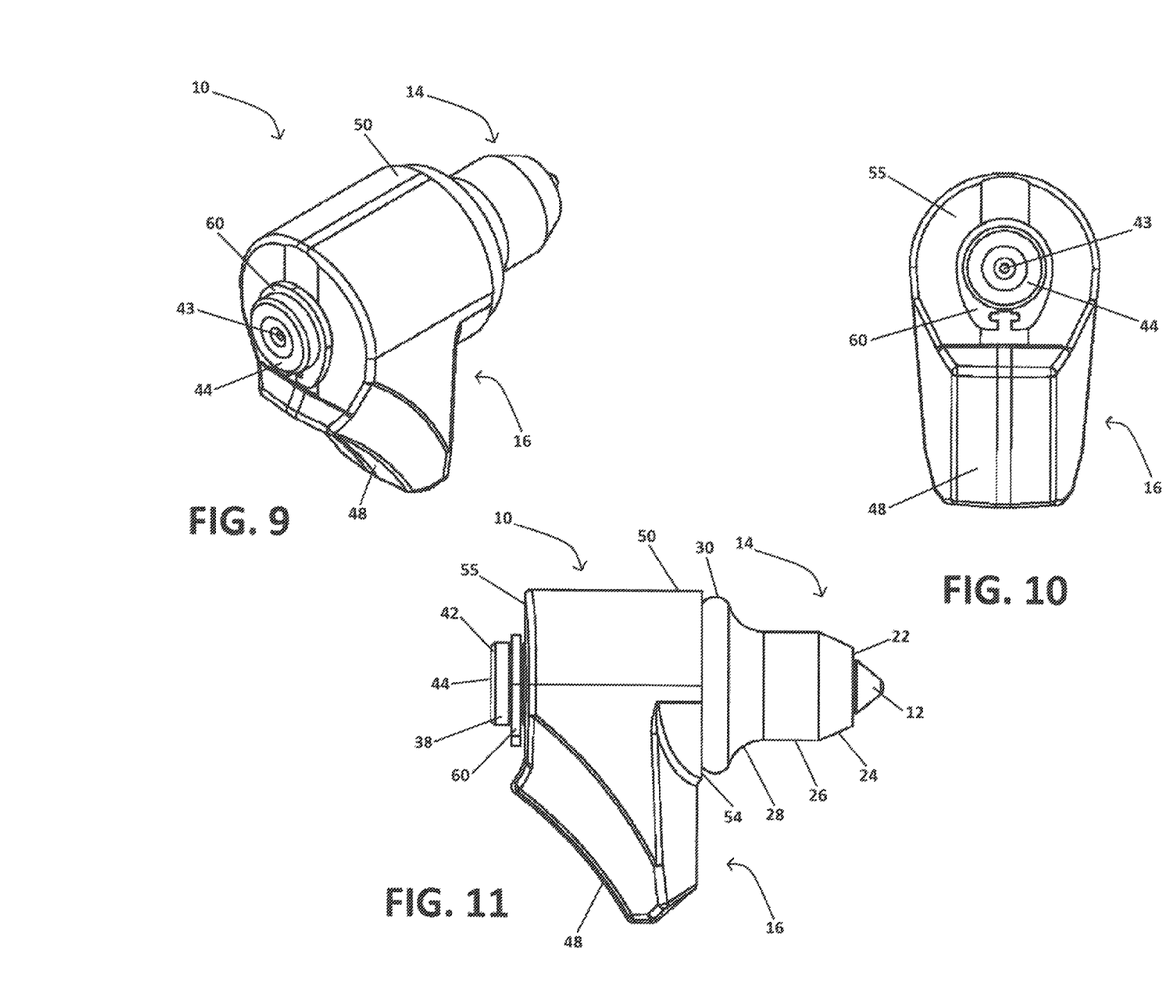
FIG. 9 is a rear perspective view of a bit assembly, showing the first embodiment of the bit retainer.
FIG. 10 is a rear elevation view of the bit assembly, showing the first embodiment of the bit retainer.
FIG. 11 is a side elevation view of the bit assembly, showing the first embodiment of the bit retainer.
Figure 20:
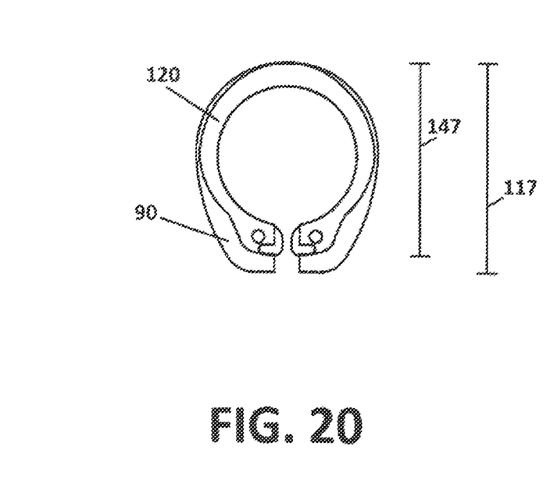
FIG. 20 is a rear elevation view of the prior art bit retainer on top of the second embodiment of the bit retainer.

A second embodiment of a bit retainer 90 is shown in FIGS. 5-8. The bit retainer 90 includes a curved, metal body having a curved side profile 112, as shown in FIGS. 7 and 8. The bit retainer 90 has a thickness 116 and a length 117 that is greater than the thickness 146 and the length 147 of the bit retainer 120 of the prior art, respectively, shown in FIG. 21, making the bit retainer 90 suitable for heavy duty operations. The bit retainer 90 includes a pair of arcuate legs 92, 94 that define an aperture 96 of the bit retainer 90. A diameter 98 of the aperture 96 is at least the diameter of the annular groove 46, such that the bit retainer 90 can fit around the annular groove 46 of the shank 20. Legs 92, 94 are joined together by an arcuate portion 100 that defines a radially expandable area 102, shown in FIG. 6, having a radial cross-section 114. Radial cross-section 114 may be constant, may vary slightly, or may be designed with a variable profile to provide better expansion characteristics for other applications. In the illustrated embodiment, the radially expandable area 102 comprises 180 degrees of the arcuate portion 100. An increased radial cross-section 108 is disposed between a distal end 93 of the leg 92 and the arcuate portion 100 and an increased radial cross-section 110 is disposed between a distal end 95 of the leg 94 and the arcuate portion 100. The radial cross-sections 108, 110 are greater than the radial cross-sections 140, 142 of the bit retainer 120 of the prior art, respectively, as shown in FIG. 20. The increased radial cross-sections 108, 110 are greater than the radial cross-section 114 of the radially expandable area 102, as shown in FIG. 6, thereby reducing the risk of failures at the increased radial cross-sections 108, 110. Legs 92, 94 include a pair of opposed arcuate cavities 104,106, respectively, adapted to guide and secure the tips of an expansion tool during removal of the bit retainer. The arcuate cavity 104 includes an open end 105 opposite an open end 107 of the arcuate cavity 106, as shown in FIG. 6. In the illustrated embodiment, the arcuate cavities 104, 106 are U-shaped, however, the arcuate cavities 104, 106 may comprise any shape. The size of arcuate cavities 74, 76 and arcuate cavities 104, 106 may be the same or substantially similar and are adapted allow the use of a common expansion tool for both bit retainer 60 and bit retainer 90.

Referring to FIGS. 9-11, 18, and 19, when assembled, the bit 14 is inserted into the base block bore 52 of the front end 50, forming a minimally spaced contact between the shank 20 and the base block bore 52. The bit 14 and the base block 16 are assembled together to form the bit assembly 10. The bit body 18, shank 20, front end 50, and base block bore 52 of base block 16 are axially aligned when assembled together to form the bit assembly 10. The shank 20 extends beyond a rearward face 55 of the base block 16 so that the annular groove 56 can be engaged by bit retainer 60 of the first embodiment or by bit retainer 90 of the second embodiment, the bit retainers 60, 90 having an outer dimension larger than the diameter of the portion of the base block bore 52 extending through the rearward face 55 of the base block 16.

Figure 12:
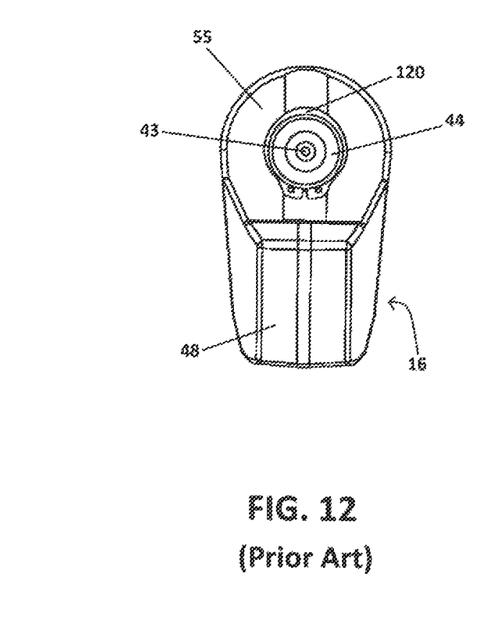
FIG. 12 is a rear elevation view of the bit assembly, showing a prior art bit retainer.
Figure 13:
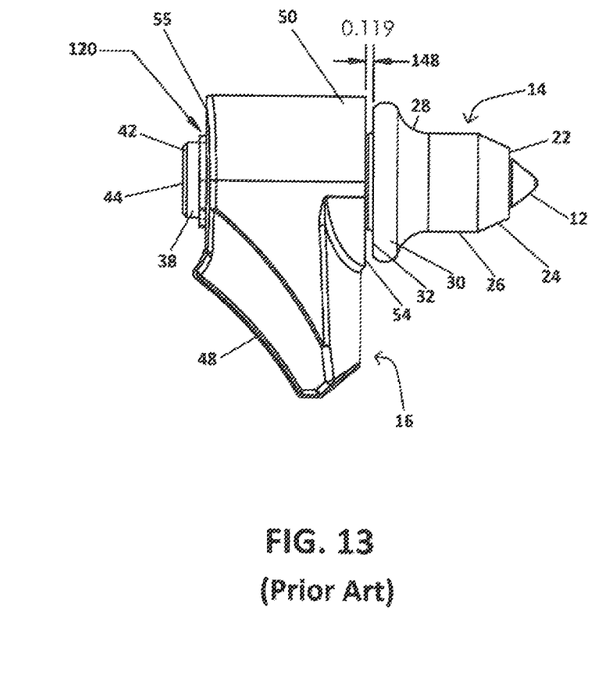
FIG. 13 is a side elevation view of the bit assembly, showing the prior art bit retainer.

Referring to FIGS. 12 and 13, the bit retainer 120 of the prior art is shown assembled with the bit assembly 10. The legs 122, 124 of the bit retainer 120 are fitted into the annular groove 46 of the shank 20. The thickness 146 is less than the axial length 47 of the annular groove 46 of the shank 20 such that the legs 122, 124 can slidably engage the annular groove 46 until the arcuate portion 130 becomes engaged with a complimentarily-shaped portion of the arcuate groove 46. In this example, once fully engaged and assembled, the bit retainer 120 of the prior art retained the bit holder 14 within the base block bore 52 of the base block 16, providing a distance 148 of 0.119 inches between the flange 32 of the bit holder 14 and the forward face 54 of the base block 16.

Figure 14:
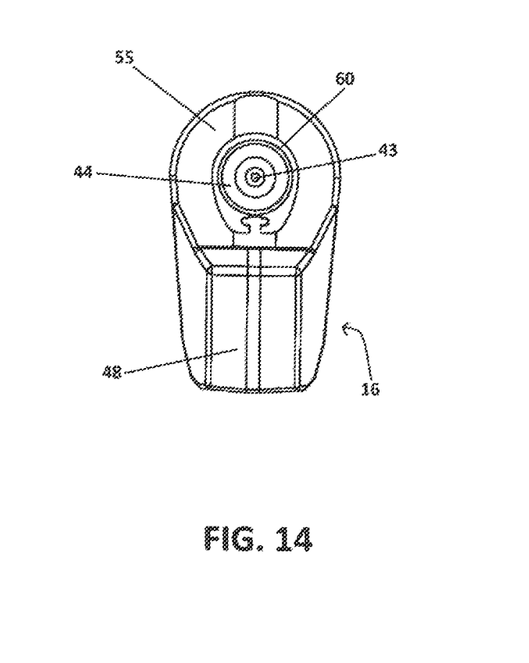
FIG. 14 is a rear elevation view of the bit assembly, showing the first embodiment of the bit retainer.
Figure 15:
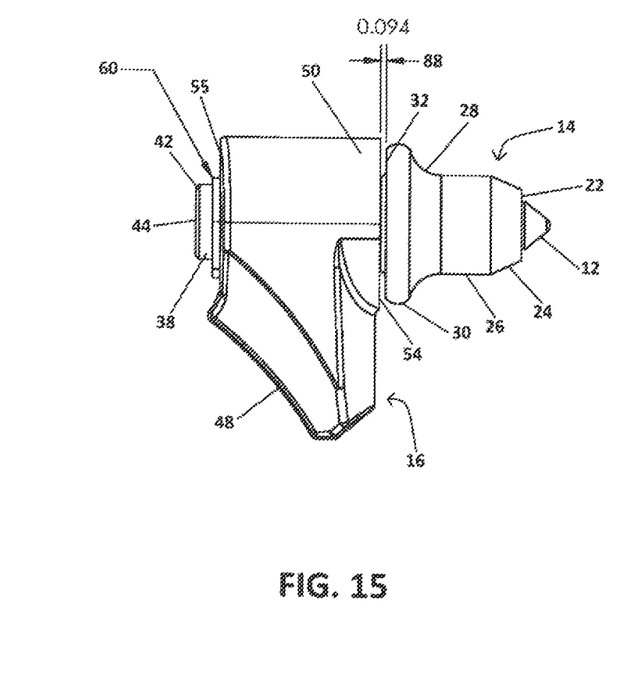
FIG. 15 is a side elevation view of the bit assembly, showing the first embodiment of the bit retainer.

Referring to FIGS. 14 and 15, the bit retainer 60 of the first embodiment is shown assembled with the bit assembly 10. The legs 62, 64 of the bit retainer 60 are fitted into the annular groove 46 of the shank 20. The thickness 86 is less than the axial length 47 of the annular groove 46 of the shank 20 such that the legs 62, 64 can slidably engage the annular groove 46 until the arcuate portion 70 becomes engaged with a complimentarily-shaped portion of the arcuate groove 46. In this example, once fully engaged and assembled, the bit retainer 60 retains the bit 14 within the base block bore 52 of the base block 16, providing an initial axial distance 88 of 0.094 inches or less between the flange 32 of the bit 14 and the forward face 54 of the base block 16.

Figure 16:
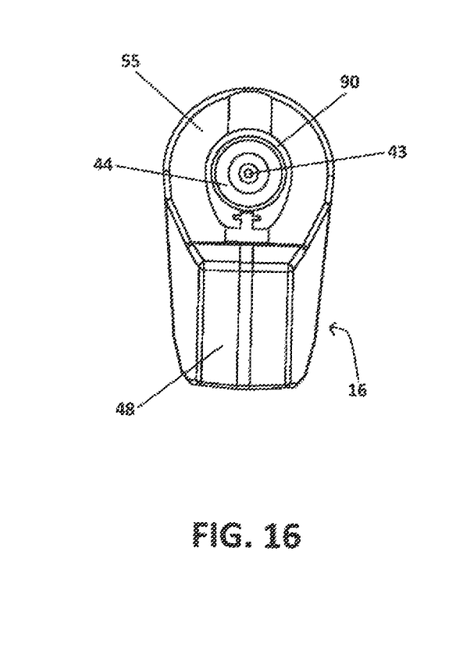
FIG. 16 is a rear elevation view of the bit assembly, showing the second embodiment of the bit retainer.

Referring to FIGS. 16 and 17, the bit retainer 90 of the second embodiment is shown assembled with the bit assembly 10. The legs 92, 94 of the bit retainer 90 are fitted into the annular groove 46 of the shank 20. The thickness 116 is less than the axial length 47 of the annular groove 46 of the shank 20 such that the legs 92, 94 can slidably engage the annular groove 46 until the arcuate portion 100 becomes engaged with a complimentarily-shaped portion of the arcuate groove 46. In this example, once fully engaged and assembled, the bit retainer 90 retains the bit 14 within the base block bore 52 of the base block 16, providing an initial axial distance 118 that is nearly zero between the flange 32 of the bit 14 and the forward face 54 of the base block 16.

Figure 24:
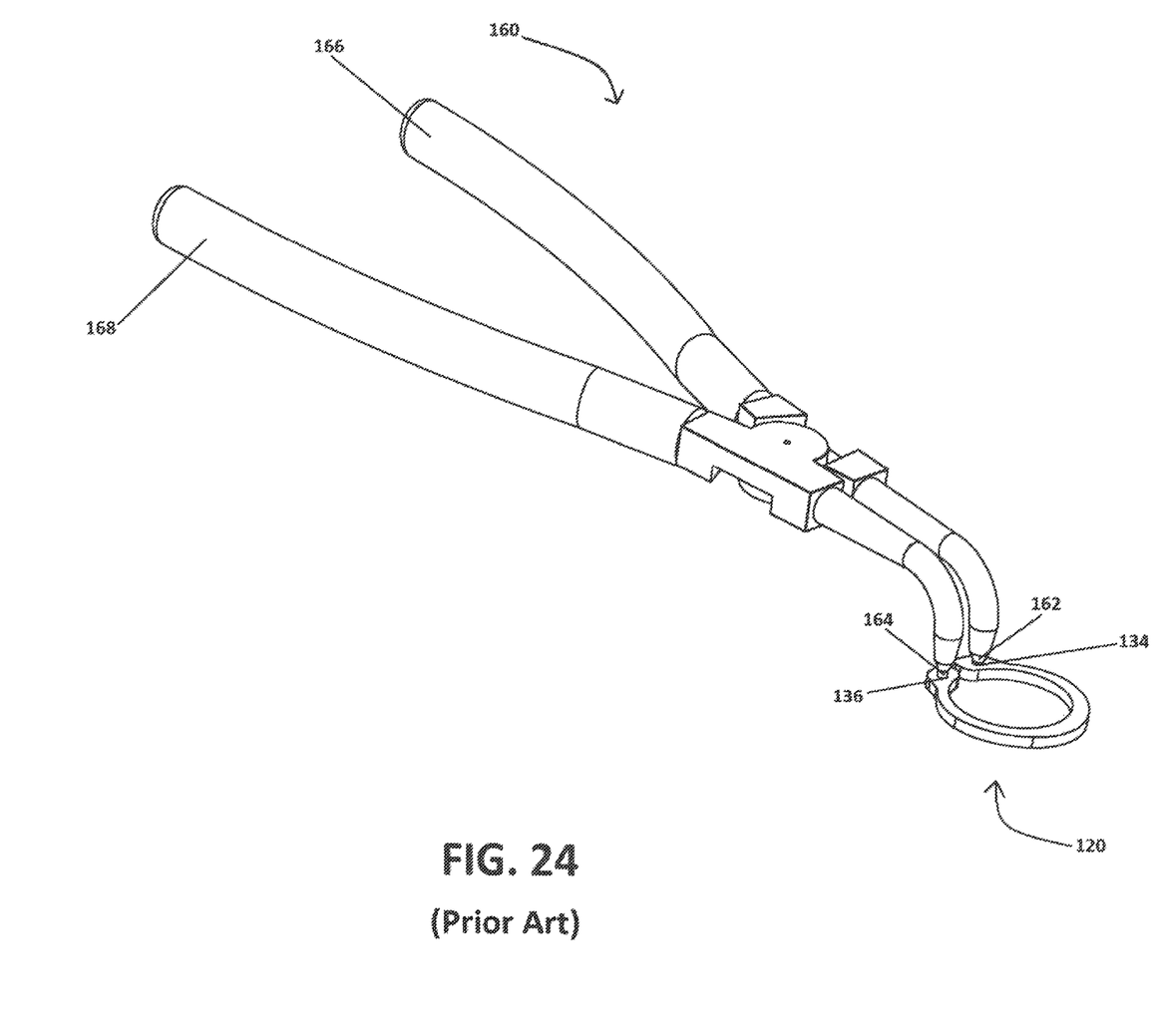
FIG. 24 is a perspective view of the pliers engaged with the prior art bit retainer.

Referring to FIG. 24, an expansion tool 160 is shown with the bit retainer 120 of the prior art. The expansion tool 160 comprises a pair of tips 162, 164 and a pair of handles 166, 168. The pair of tips 162, 164 are adapted to engage apertures 134, 136 of legs 122, 124 of the bit retainer 120. As handles 166, 168 of the expansion tool 160 are forced towards each other, the tips 162, 164 are forced away from each other, which in turn forces leg 122 away from leg 124 and expands the radially expandable area 132 in order to facilitate removal the bit retainer 120 from the bit assembly 10.

Figure 25:
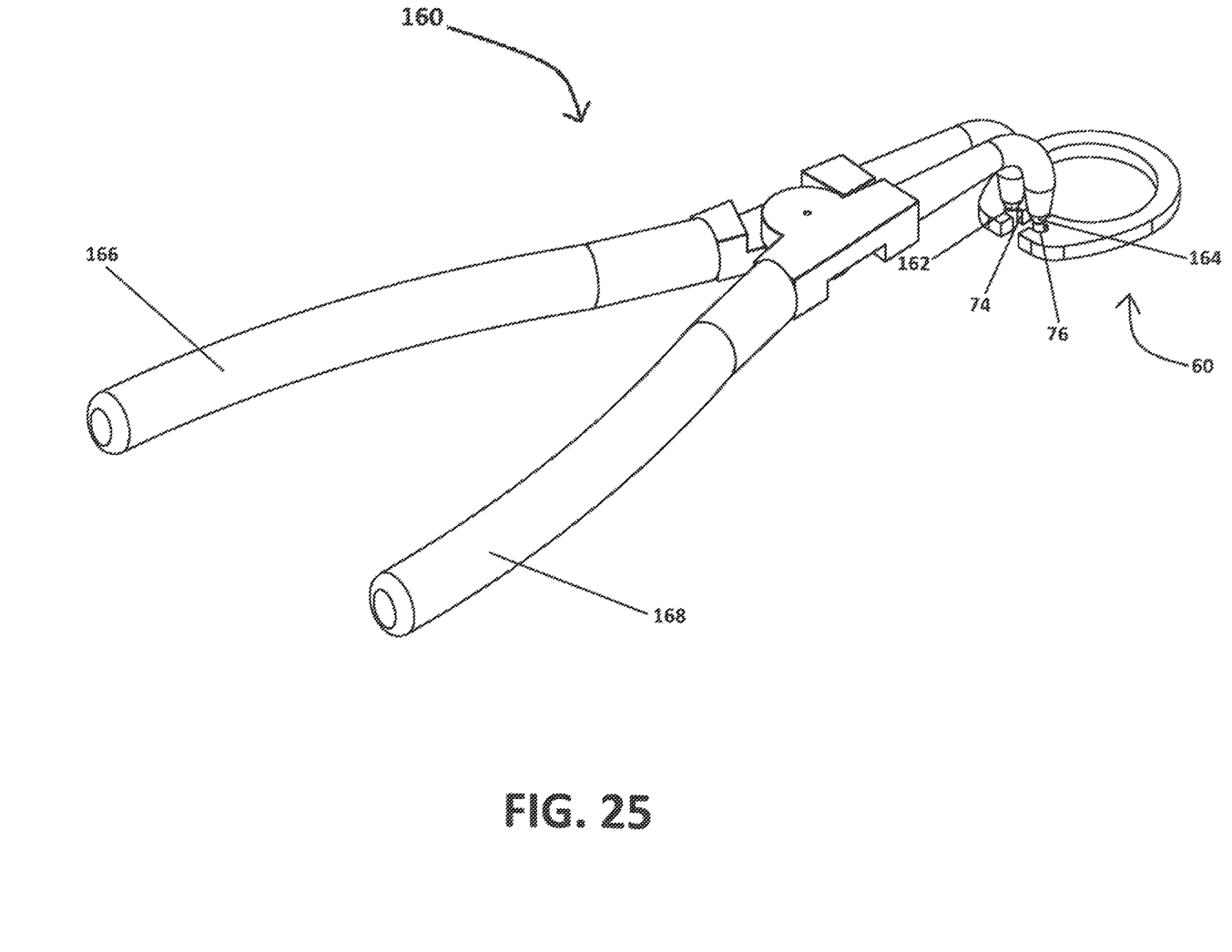
FIG. 25 is a perspective view of a pair of pliers engaged with the first embodiment of the bit retainer.

Referring to FIG. 25, the expansion tool 160 is shown with the bit retainer 60 of the first embodiment. The pair of tips 162, 164 are adapted to vertically or laterally engage arcuate cavities 74, 76 of legs 62, 64 of the bit retainer 60. As handles 166, 168 of the expansion tool 160 are forced towards each other, the tips 162, 164 are forced away from each other, which in turn forces leg 62 away from leg 64 and expands the radially expandable area 72 in order to facilitate removal of the bit retainer 60 from the bit assembly 10.

While the present disclosure has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A retainer for a bit assembly, comprising:
  a retainer body including a first surface equally spaced from a second surface, a radially expandable and deformable arcuate top portion, and a first non-deformable arcuate leg extending to a first flat distal surface of the first non-deformable arcuate leg parallel and opposite a second flat distal surface of a second non-deformable arcuate leg, each non-deformable arcuate leg depending from opposite sides of the expandable and deformable arcuate top portion, the first flat distal surface and the second flat distal surface extending from the first surface to the second surface of the retainer body, and the radially expandable arcuate top portion comprising a periphery of 180 degrees and a constant radial cross-section over the 180 degree periphery;
  the first non-deformable arcuate leg including a first cavity and the second non-deformable arcuate leg including a second cavity, the first cavity inwardly extending from the first flat distal surface of the first non-deformable arcuate leg opposite the second flat distal surface of the second non-deformable arcuate leg and the second cavity inwardly extending from the second flat distal surface of the second non-deformable arcuate leg opposite the first flat distal surface of the first non-deformable arcuate leg; and a radial cross-section of the first non-deformable arcuate leg and the second non-deformable arcuate leg being greater than the constant radial cross-section of the radially expandable and deformable arcuate top portion to reduce a risk of failure at the radial cross-section of the first non-deformable arcuate leg and the second non-deformable arcuate leg.

2. The retainer of claim 1, wherein the retainer body has one of a flat profile and a curved profile.

3. The retainer of claim 1, wherein the first cavity and the second cavity are U-shaped.

4. The retainer of claim 1, wherein the first cavity comprises a first open end opposite the second cavity and the second cavity comprises a second open end opposite the first cavity.

5. A bit assembly, comprising:
a base block comprising a bore;
a bit comprising:
a forward body portion; and
a generally cylindrical shank depending axially from the forward body portion, the shank comprising an annular groove adjacent a distal end of the shank, wherein the shank is adapted to provide a small clearance between the bore of the base block; and
a retainer comprising:
a retainer body including a first surface equally spaced from a second surface, a radially expandable and deformable arcuate top portion, and a first non-deformable arcuate leg extending to a first flat distal surface of the first non-deformable arcuate leg parallel and opposite a second flat distal surface of a second non-deformable arcuate leg, each non-deformable arcuate leg depending from opposite sides of the expandable and deformable arcuate top portion, the first flat distal surface and the second flat distal surface extending from the first surface to the second surface of the retainer body, and the radially expandable and deformable arcuate top portion comprising a periphery of 180 degrees and a constant radial cross-section over the 180 degree periphery;
the first non-deformable arcuate leg including a first cavity and the second non-deformable arcuate leg including a second cavity, the first cavity inwardly extending from the first flat distal surface of the first non-deformable arcuate leg opposite the second flat distal surface of the second non-deformable arcuate leg and the second cavity inwardly extending from the second flat distal surface of the second non-deformable arcuate leg opposite the first flat distal surface of the first non-deformable arcuate leg, the first non-deformable arcuate leg and the second non-deformable arcuate leg adapted to engage the annular groove of the shank; and
a radial cross-section of the first non-deformable arcuate leg and the second non-deformable arcuate leg being greater than the constant radial cross-section of the radially expandable and deformable arcuate top portion to reduce a risk of failure at the radial cross-section of the first non-deformable arcuate leg and the second non-deformable arcuate leg.

6. The bit assembly of claim 5, wherein the retainer body has one of a flat profile and a curved profile.

7. The bit assembly of claim 5, wherein the first cavity and the second cavity are U-shaped.

8. The bit assembly of claim 5, wherein the shank is solid.

9. The bit assembly of claim 5, wherein the first cavity comprises a first open end opposite the second cavity and the second cavity comprises a second open end opposite the first cavity.

10. A combination comprising:
a bit comprising:
a forward body portion; and
a generally cylindrical shank depending axially from the forward body portion, the shank comprising an annular groove adjacent a distal end of the shank; and
a retainer comprising:
a retainer body including a first surface equally spaced from a second surface, a radially expandable and deformable arcuate top portion, and a first non-deformable arcuate leg extending to a first flat distal surface of the first arcuate leg parallel and opposite a second flat distal surface of a second non-deformable arcuate leg, each non-deformable arcuate leg depending from opposite sides of the expandable and deformable arcuate top portion, the first flat distal surface and the second flat distal surface extending from the first surface to the second surface of the retainer body, and the radially expandable and deformable arcuate top portion comprising a periphery of 180 degrees and a constant radial cross-section over the 180 degree periphery;
the first non-deformable arcuate leg including a first cavity and the second non-deformable arcuate leg including a second cavity, the first cavity inwardly extending from the first flat distal surface of the first non-deformable arcuate leg opposite the second flat distal surface of the second non-deformable arcuate leg and the second cavity inwardly extending from the second flat distal surface of the second non-deformable arcuate leg opposite the first flat distal surface of the first non-deformable arcuate leg, the first non-deformable arcuate leg and the second non-deformable arcuate leg adapted to engage the annular groove of the shank; and
a radial cross-section of the first non-deformable arcuate leg and the second non-deformable arcuate leg being greater than the constant radial cross-section of the radially expandable and deformable arcuate top portion to reduce a risk of failure at the radial cross-section of the first non-deformable arcuate leg and the second non-deformable arcuate leg.

11. The combination of claim 10, wherein the retainer body has one of a flat profile and a curved profile.

12. The combination of claim 10, wherein the first cavity and the second cavity are U-shaped.

13. The combination of claim 10, wherein the shank is solid.

14. The combination of claim 10, wherein the first cavity comprises a first open end opposite the second cavity and the second cavity comprises a second open end opposite the first cavity.

* * * * *